March 31, 1942.   A. E. ARMSTRONG   2,277,944
RADIATOR TEMPERATURE CONTROL
Filed Aug. 19, 1940

INVENTOR.
Adam E. Armstrong
BY Carl & Chappell
ATTORNEYS

Patented Mar. 31, 1942

2,277,944

UNITED STATES PATENT OFFICE 2,277,944

RADIATOR TEMPERATURE CONTROL

Adam E. Armstrong, Three Rivers, Mich., assignor to Armstrong Machine Works, Three Rivers, Mich.

Application August 19, 1940, Serial No. 353,267

13 Claims. (Cl. 236—36)

The main objects of my invention are:

First, to provide a radiator control for steam heating systems whereby the temperature of individual rooms heated thereby may be set and controlled as desired.

Second, to provide a control of the type described which is exceedingly delicate and flexible in operation.

Third, to provide a control of the type described which is simple in its parts and unlikely to become inoperative through continued use.

Fourth, to provide a novel method of controlling a steam heated radiating element.

Further objects relating to details and economies of my invention will definitely appear from the description to follow. The invention is defined in the claims.

A structure embodying the features of my invention is clearly illustrated in the accompanying drawing in which.

Figure 1:
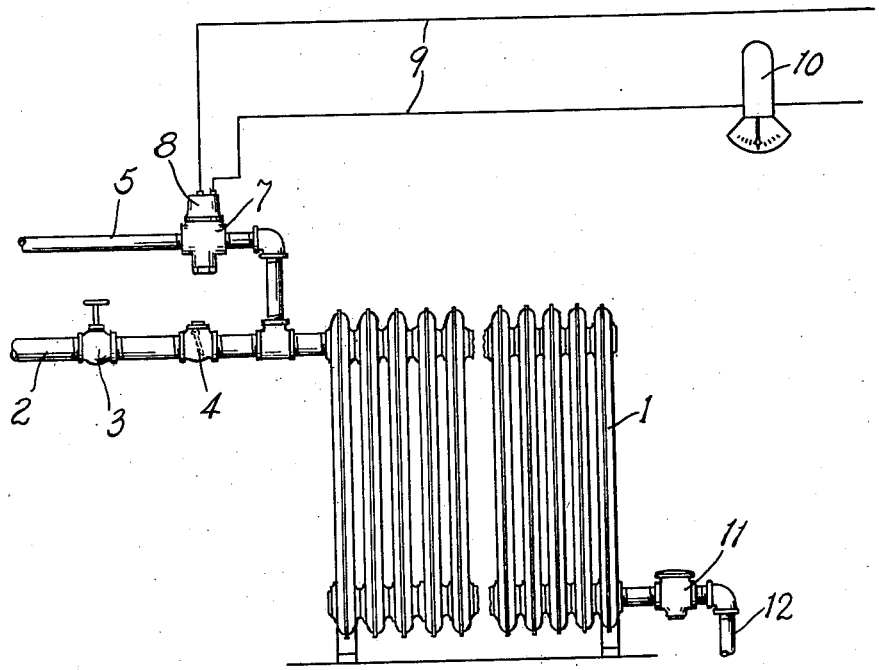
Fig. 1 is a diagrammatic view illustrating the control of my invention in a preferred embodiment with a steam heated radiator of a domestic heating system.
Figure 2:
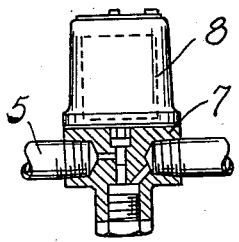
Fig. 2 is a view partly in section illustrating an automatic valve suitable for use in the aforesaid control.

In the usual steam heating system it is very difficult to attain anything approaching an individual control of the heat radiated by the heating units in individual rooms of a house or building, such attempts having been confined mainly to varying the size or radiating capacity of the individual radiating units and manual control of the radiator valves. However, the rooms themselves have different radiating capacities and, furthermore, the occupants may desire to vary the temperature from time to time, and so far as I am aware no control has been designed which successfully meets these factors or requirements. The control system of my invention enables the temperature of individual rooms to be set and maintained as desired, being dependent entirely upon the actual temperature of the room for its actuation.

In the drawing I illustrate a heating unit for a single room and an individual control therefor, it being understood that similar units and controls are adapted to be supplied for any room of which the temperature is desired to be regulated of the same system. The reference numeral 1 designates a conventional radiator of a steam heating system, which is supplied with steam through an inlet connection 2. This connection has inserted therein a manually operable control or feed valve 3 and between the said valve and the radiator a return check valve 4 is inserted.

An air feed line 5 communicates with the steam feed line 6 between the check valve 4 and the radiator and in this air feed line I place an automatic solenoid controlled valve 7, the solenoid 8 thereof being adapted to be energized by the leads 9. Alternatively, this valve may be an air controlled valve or other similar automatic valve capable of being actuated in response to a thermostat in the manner to be hereinafter described.

A suitable thermostat 10 is inserted in the electrical line, this thermostat being of any conventional type, though preferably constructed as illustrated in my application, Serial No. 296,053, filed September 22, 1939, wherein certain stabilizing features enable an exceedingly delicate response and non-fluttering operation of the thermally responsive element. In the present installation the thermostat is a single acting one, i. e., an electrical circuit through leads 9 is completed when the temperature rises above a predetermined adjustable point, the circuit being automatically broken through separation of contacts in the thermostat when the temperature falls below the aforesaid point.

The reference numeral 11 designates an inverted bucket type steam trap of the general design illustrated in my Patents 1,787,465, of January 6, 1931; 1,856,451, of May 3, 1932; 1,979,305, of November 6, 1934; and 2,005,926, of June 25, 1935. This trap is applied to the exhaust or discharge side of the radiator 1 and which is adapted to pass air and condensate to the exhaust pipe 12, but to prevent the passage of steam thereto. Such traps are well-known, hence, I have not further illustrated the same.

The capacity of trap 11 for venting off air must be somewhat less than the rate at which air is supplied from line 5 when the solenoid valve 7 is open. Furthermore, the air is supplied through the last named line at a pressure slightly in excess of the steam pressure in steam inlet line 2. For example, for a steam pressure of, say, 10 pounds, the air pressure should be approximately 11 pounds per square inch.

In operation, assuming radiator 1 to be filled with steam and that the temperature in the room rises above the point for which thermostat 10 is set, the thermally responsive element of the latter makes a contact completing a circuit through conductors 9, actuating solenoid 8 to open the valve in the air line. This admits a certain amount of air to the radiator, at the same time causing the check valve 4 to close due to the excess in pressure of the air over the steam. Of course, it requires heat to raise the temperature of the incoming air to the temperature of the steam in the radiator, with the result that the heat radiated from the latter decreases. The steam trap 11 separates air and condensate from the steam in the radiator and vents the same, but, as stated, it vents air at a slower rate than it is admitted to the radiator.

As the pressure in the radiator rises to equal the pressure in the air line, i. e., 11 pounds per square inch, flow of air as well as steam is stopped until further condensation of steam in the radiator admits of more air being supplied. As this process goes on the heat radiated from the radiator decreases steadily until the room reaches a temperature below the desired level, whereupon the thermostat operates to break the electric circuit to the solenoid and thereby close valve 7. Steam from supply line 2 is then admitted to the radiator at the rate that air is discharged from the radiator by the steam trap, the radiator being heated accordingly and increasing the temperature of the room. Once the radiator has attained a heat sufficient to maintain the desired temperature of the room, thereafter any variations in the temperature in either direction, however slight, are immediately compensated for by the control system which is essentially characterized by the great sensitivity thereof.

I believe it to be novel with me to employ an air supply metered or delivered into the steam radiator in the manner disclosed to effect a control of the delivery of steam thereto, it having been heretofore considered of the greatest importance to prevent the entrance of any air whatsoever into steam heating systems. The actual structural embodiment for performing the temperature controlling operation is simple in its parts. It relies in operation on the sensitivity and responsiveness and efficiency of those parts, and is itself of comparable sensitivity, responsiveness, accuracy and efficiency. The aforesaid parts are all standard in nature and may be secured at reasonable prices, so the cost of individual installations of the control in different rooms is not excessive in view of the advantages derived therefrom.

I have illustrated and described my improvements in an embodiment which is very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A temperature control adapted to be associated with an individual steam heated radiating element of the room to control the temperature of the room as desired, comprising a steam supply line connected to said element, a source of air supply connected to said steam supply line, a return check valve in the steam supply line between the source of steam supplied and the point of connection of said air supply, an automatic solenoid actuated valve controlling said air supply, electrical leads connected to the solenoid actuating said valve, a thermally responsive member in the room controlling an electrical circuit through said leads whereby to open the valve to admit air to said element in the event a predetermined room temperature is exceeded and to close the valve at temperatures beneath said predetermined temperature, and a steam trap on the discharge side of said radiating element adapted to separate and discharge air and condensate from the steam in the element while preventing discharge of the steam, said automatic valve when open supplying air to said element at a pressure somewhat in excess of the steam supply pressure and in an amount exceeding the capacity of the trap to discharge air whereby to maintain said check valve closed when the pressure in the radiating element reaches the pressure of the air supplied, the amount of heat radiated from said element being decreased by air mixed with the steam therein whereby the temperature in the room falls, said trap discharging air to permit the admission of further steam when the temperature of the room falls below said predetermined point and the automatic valve closes.

2. A temperature control for a room adapted to be associated with an individual steam heated radiating element in the room to vary the temperature of the room as desired, comprising a steam supply line connected to said element, a source of air supply connected to said steam supply line, a return check valve in the steam supply line between the source of steam supplied and the point of connection of said air supply, an automatic valve controlling said air supply, a thermally responsive member in the room connected to and controlling said automatic valve whereby to open the same to admit air to said element in the event a predetermined temperature in said atmosphere is exceeded and to close the valve at temperatures beneath said predetermined temperature, and a steam trap on the discharge side of said radiating element adapted to separate and discharge air and condensate from the steam in the element while preventing discharge of the steam, said automatic valve when open supplying air to said element at a pressure somewhat in excess of the steam supply pressure and in an amount exceeding the capacity of the trap to discharge air whereby to maintain said check valve closed when the pressure in the radiating element reaches the pressure of the air supplied, the amount of heat radiated from said element being decreased by air mixed with the steam therein whereby the temperature in the room falls, said trap discharging air to permit the admission of further steam when the temperature of the room falls below said predetermined point and the automatic valve closes.

3. A temperature control for a room adapted to be associated with an individual steam heated radiating element in the room to vary the temperature of the room as desired, comprising a source of air supply communicating with the element, an automatic valve controlling said air supply, a thermally responsive member in the room connected to and controlling said automatic valve whereby to open the same to admit air to said element in the event a predetermined temperature in said atmosphere is exceeded and to close the valve at temperatures beneath said predetermined temperature, and a member on the discharge side of said radiating element adapted to separate and discharge air from the steam in the element while preventing discharge of the steam, said automatic valve when open supplying air to said element at a pressure somewhat in excess of the steam supply pressure and in an amount exceeding the capacity of said member to discharge air whereby the amount of heat radiated from said element is decreased by air mixed with the steam therein and the temperature in the room falls, said air separating member discharging air to permit the admission of further steam when the temperature of the atmosphere falls below said predetermined point and the automatic valve closes.

4. A temperature control for an individual steam heated radiating element, said control being operated in response to the temperature of the atmosphere heated by the element and comprising a source of air supply communicating with the element, an automatic value controlling said air supply, a thermally responsive member disposed externally of the element and connected to and controlling said automatic valve whereby to open the same to admit air to said element in the event a predetermined temperature in said atmosphere is exceeded and to close the valve at temperatures beneath said predetermined temperature, and a member on the discharge side of said radiating element adapted to separate and discharge air from the steam in the element while preventing discharge of the steam, said automatic valve when open supplying air to said element whereby the amount of heat radiated from said element is decreased by air mixed with the steam therein and the temperature of said atmosphere falls, said air separating member discharging air from the mixture in said element at a rate lower than the rate of air admission from said air supply source, whereby to permit heating of the incoming air and an accompanying drop in temperature of the element, said thermally responsive member controlling the admission of further steam when the temperature of the atmosphere falls below said predetermined point and the automatic valve closes.

5. A control for a steam heated radiating element, comprising a source of air supply communicating with the interior of said element, an automatic valve controlling said air supply, means for actuating said valve for admitting air from said supply to the interior of said element in the event a predetermined temperature externally of the same is exceeded, and means to separate and discharge air from the steam in the element at a slower rate than the rate of admission of air thereto, while preventing discharge of the steam, the heat radiated from said element being decreased by air mixed with the steam therein to cause said temperature to fall, said automatic valve operating when said temperature falls below a predetermined point to prevent the admission of further air to the element.

6. A control for a steam heated radiating element, comprising means for admitting air to the interior of said element, means to separate and discharge air from the steam in the element at a slower rate than the rate of admission of air thereto, while preventing discharge of the steam, the heat radiated from said element being decreased by air mixed with the steam therein, and means to supply steam to the interior of said element when the pressure therein drops below a predetermined point.

7. In a heat exchange system, the combination with a heat exchange element, a heating fluid supply conduit provided with a manual control valve and a return check valve at the rear of said manual control valve, an air pipe connected to the heat exchange element at the rear of said check valve and adapted to deliver air at a pressure in excess of the pressure of the heating fluid, whereby when the pressure in the heat exchange element exceeds that of the heating fluid the check valve is closed to stop the flow of heating fluid, a thermostatically controlled valve for said air pipe, the thermostat being operatively associated with said heat exchange element, and a discharge for said heat exchange element provided with an air eliminator, said eliminator being continuously effective during the operation of said system to discharge air from the element at a rate lower than the rate of air admission thereto.

8. In an apparatus of the class described, the combination with a heat exchange element, of a heating fluid supply conduit therefor provided with a return check valve, a discharge for said heat exchange element provided with an air eliminator, said eliminator being continuously effective during the operation of the system to discharge air from the element at a rate lower than the rate of air admission thereto, an air supply conduit connected to said heat exchange element at the rear of said check valve and adapted to deliver air at a pressure in excess of the pressure of the heating fluid in said heating fluid conduit, and a thermostatically controlled valve for said air conduit operatively associated with said heat exchange element.

9. In an apparatus of the class described, the combination with a heat exchange element, of a heating fluid supply conduit therefor provided with a return check valve, an air supply conduit connected to the heating fluid supply conduit between said check valve and the heat exchange element and adapted to deliver air to the element at a pressure in excess of the pressure of the heating fluid in said heating fluid conduit, and discharge means connected to said heat exchange element including an air eliminator having means continuously effective during the operation of the apparatus to separate air and condensed heating fluid from the contents of the element and discharge the air at a rate slower than the rate of admission to the element.

10. In an apparatus of the class described, the combination with a heat exchange element, of a heating fluid supply conduit therefor, an air supply conduit connected to the heating fluid supply conduit and adapted to deliver air to the element at a pressure in excess of the pressure of the heating fluid in said heating fluid conduit, and discharge means connected to said heat exchange element including an air eliminator having means continuously effective during the operation of the apparatus to separate air from the contents of the element and discharge the air at a rate slower than the rate of admission to the element.

11. In an apparatus of the class described, the combination with a heat exchange element, of a heating fluid supply conduit therefor, an air supply conduit connected to the element and adapted to deliver air thereto at a pressure in excess of the pressure of the heating fluid in said heating fluid conduit, and discharge means connected to said heat exchange element including an air eliminator having means continuously effective during the operation of the apparatus to separate air from the contents of the element and discharge the air at a rate slower than the rate of admission to the element.

12. In an apparatus of the class described, the combination with a heat exchange element, of a heating fluid supply conduit therefor provided with a return check valve, an air supply conduit connected to the heating fluid supply conduit between said check valve and the heat exchange element and adapted to deliver air to the element, and discharge means connected to said heat exchange element including an air eliminator having means continuously effective during the operation of the apparatus to separate air and condensed heating fluid from the contents of the element and discharge the air at a rate lower than the rate of admission of air thereto.

13. In an apparatus of the class described, the combination with a heat exchange element, of a heating fluid supply conduit therefor, an air supply conduit connected to the heating fluid supply conduit and adapted to deliver air to the element, and discharge means connected to said heat exchange element including an air eliminator having means continuously effective during the operation of the apparatus to separate air from the contents of the element and discharge the air at a rate lower than the rate of admission of air thereto.

ADAM E. ARMSTRONG.